(12) United States Patent
Lee et al.

(10) Patent No.: US 7,172,330 B2
(45) Date of Patent: Feb. 6, 2007

(54) BACKLIGHT ASSEMBLY AND DISPLAY DEVICE HAVING THE SAME

(75) Inventors: Sang-Hoon Lee, Yongin-si (KR); Jong-Dae Park, Seoul (KR); Jeong-Hwan Lee, Suwon-si (KR); Jae-Ho Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 153 days.

(21) Appl. No.: 10/930,472

(22) Filed: Aug. 31, 2004

(65) Prior Publication Data

US 2005/0063170 A1  Mar. 24, 2005

(30) Foreign Application Priority Data

Sep. 18, 2003  (KR) .................... 10-2003-0064775

(51) Int. Cl.
*F21V 7/04* (2006.01)
(52) U.S. Cl. .................... 362/634; 349/58; 349/70
(58) Field of Classification Search ........ 362/633, 362/634, 632, 239; 349/58, 70
See application file for complete search history.

(56) References Cited

U.S. PATENT DOCUMENTS

| | | | | |
|---|---|---|---|---|
| 5,743,063 A | * | 4/1998 | Boozer ................... | 52/713 |
| 2002/0005929 A1 | * | 1/2002 | Imabayashi et al. ........ | 349/155 |
| 2002/0075667 A1 | * | 6/2002 | Kawashima et al. ......... | 362/26 |
| 2002/0113924 A1 | * | 8/2002 | Saito et al. ................ | 349/112 |
| 2004/0156183 A1 | * | 8/2004 | Kim ........................... | 362/31 |

* cited by examiner

*Primary Examiner*—Renee Luebke
*Assistant Examiner*—Julie A. Shallenberger
(74) *Attorney, Agent, or Firm*—Cantor Colburn LLP (57) ABSTRACT

A backlight assembly includes at least one lamp generating light, a container having a receiving space, and a lamp fixing member disposed in the receiving space of the container. The lamp fixing member includes base arms disposed substantially parallel with each other, at least one lamp clip that grips the at least one lamp and is connected between the base arms, and at least one buffer formed in the respective base arms to allow variation in a length of the base arms due to changes in a size of the receiving space. An image display device includes a display panel for displaying images, and the backlight assembly to provide the light to the display panel. The image display device also includes a top chassis having another buffer allowing variation in a length of chassis sections.

45 Claims, 8 Drawing Sheets

BACKLIGHT ASSEMBLY AND DISPLAY DEVICE HAVING THE SAME

BACKGROUND OF THE INVENTION

1. Field of the Invention

The present invention relates to devices for displaying images, and more particularly, to a backlight assembly for providing light in an image display device and a liquid crystal display device having the backlight assembly.

2. Description of the Related Art

In general, liquid crystal display devices displaying images using optical characteristics of liquid crystal have a display panel to display images and a backlight assembly to provide light to the display panel. Backlight assemblies may be classified into edge-type backlight assemblies and direct-downward-type backlight assemblies in terms of the position of lamps generating the light.

In an edge-type backlight assembly, a lamp is disposed at the side of a light guide plate of the backlight assembly. The edge-type backlight assemblies are mainly used for display devices with a small size and/or light weight.

In contrast, multiple lamps are disposed under the display panel in a direct-downward-type backlight assembly. The direct-downward-type backlight assemblies provide light having higher luminance than that of the edge-type backlight assemblies. The direct-downward-type backlight assemblies are mainly used for mid- or large-size display devices.

In the direct-downward-type backlight assemblies, multiple lamps are arranged parallel with each other to generate high luminance light. The lamps in a direct-downward-type backlight assembly are generally external electrode fluorescent lamps (EEFLs), which are readily driven in parallel and cost effective. The lamps (EEFLs) are combined with a lamp socket and received in a mold frame. The lamp socket has multiple clips to secure the lamps and is made of metal to provide electric power to the lamps. The mold frame receiving the lamps is made of synthetic resin.

Since a direct-downward-type backlight assembly employs multiple lamps, the heat generated by the lamps in the direct-downward-type backlight assembly is higher than that in an edge-type backlight assembly. For this reason, the temperature changes inside a direct-downward-type backlight assembly are larger than those in an edge-type backlight assembly.

The lamp socket and the mold frame are generally made of metal and resin, respectively, which have different thermal expansion coefficients. The thermal expansion coefficient of resin is higher than that of metal. Thus, as temperature increases, the volume increase of the mold frame is larger than that of the lamp socket. As a result, the lamp socket is distorted or buckled because of the difference in the volume increases between the mold frame and the lamp socket.

Therefore, a need exists for a backlight assembly which provides high luminance light without such distortion or buckling of the lamp socket. Further, it will be advantageous to provide an image display device employing such a backlight assembly.

SUMMARY OF THE INVENTION

The above mentioned and other drawbacks and deficiencies of the prior art are overcome or alleviated by a backlight assembly and an image display device employing the same according to the present invention. In one embodiment, a backlight assembly includes at least one lamp that generates light, and a lamp fixing member including base arms disposed substantially parallel with each other, at least one lamp clip that grips the at least one lamp and is connected between the base arms, and at least one buffer formed in the respective base arms. The backlight assembly may also include a container having a receiving space for receiving the lamp fixing member. The at least one buffer is formed in the respective base arms to allow variation in a length of the base arms due to changes in a size of the receiving space. The base arms each have a first side in contact with the container and a second side opposite to the first side, the at least one buffer is protruded from the first side toward the container. The container includes at least one groove to receive the at least one buffer protruded from the first side of the base arms. In another embodiment, the at least one buffer is protruded from the second side.

The at least one buffer may include a first section substantially parallel but not coplanar with the base arms, a second section that is substantially perpendicular to the base arms and connects one end of the first section and a base arm, and a third section that is substantially perpendicular to the base arms and connects an opposing end of the first section and the base arm. The lamp fixing member may further include at least one flange extended from one of the base arms in a direction same as the at least one lamp clip is protruded. The at least one flange is disposed adjacent to the at least one lamp clip to prevent movement of the at least one lamp in a longitudinal direction of the at least one lamp. The at least one flange includes multiple flanges and the at least one lamp clip includes multiple lamp clips, each of the flanges being disposed adjacent to corresponding one of the lamp clips.

In another embodiment, an image display device includes a display panel that displays images, and a backlight assembly that provides light to the display panel, in which the backlight assembly includes at least one lamp that generates the light, a container having a receiving space, and a lamp fixing member disposed in the receiving space, which has a length varying depending on changes in a size of the receiving space. The image display device may further include a top chassis that holds the display panel onto the container. The top chassis includes at least one second buffer disposed on respective sections of the top chassis, and the at least one second buffer allows variation in a length of the respective sections depending on changes in the size of the receiving space.

The at least one second buffer includes side sections each extended from an edge of respective subsections of the top chassis in a direction substantially perpendicular to the subsections, and top section connected between edges of the side sections opposite to edges connected with the subsections, wherein the side sections and the top section form a space of which shape varies depending on changes in the length of the base arms.

These and other features and advantages of the present invention will become apparent from the following detailed description of illustrative embodiments thereof, which is to be read in connection with the accompanying drawings.

BRIEF DESCRIPTION OF THE DRAWINGS

This disclosure will present in detail the following description of exemplary embodiments with reference to the following figures wherein.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
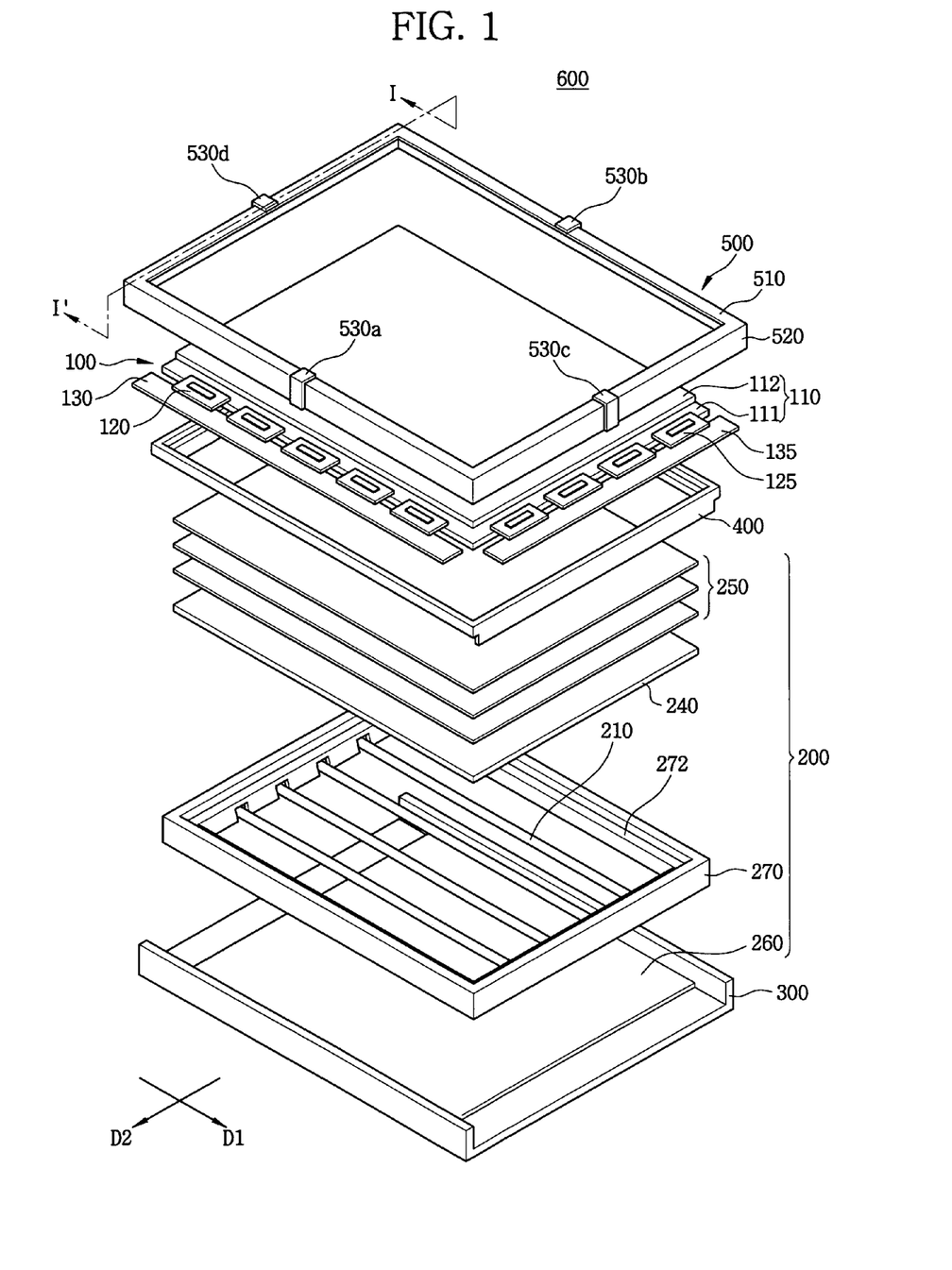
FIG. 1 is a perspective view of an image display device according to an exemplary embodiment of the present invention.

Referring to FIG. 1, an image display device 600, such as a liquid crystal display (LCD) device, according to an exemplary embodiment of the present invention is provided. The LCD device 600 includes a display panel assembly 100 for displaying images, a backlight assembly 200 for providing light to the display panel assembly 100, and a container 300 for receiving the backlight assembly 200, a first mold frame 400 for receiving the display panel assembly 100, and a top chassis 500 to securely cover the display panel assembly 100.

The display panel assembly 100 includes a display panel 110, data and gate tape carrier packages (TCPs) 120 and 125 for providing driving and control signals to the display panel 110, and data and gate printed circuit boards (PCBs) 130 and 135 for generating the driving and control signals.

The display panel 110 includes a thin film transistor (TFT) substrate 111 having TFTs as switching elements, a color filter substrate 112 having color filters, and a crystal layer (not shown) disposed between the TFT substrate 111 and the color filter substrate 112. The TFTs in the TFT substrate 111 are arranged in a matrix form. The color filters of the color filter substrate 112 include R-G-B (red-green-blue) color filters transmitting light to generate red light, green light and blue light, respectively.

The data TCPs 120 are connected with source terminals of the TFT substrate 111, and the gate TCPs 125 are connected with gate terminals of the TFT substrate 111. The data and gate TCPs 120 and 125 are also connected with the data and gate PCBs 130 and 135, respectively. The driving and control signals generated from the data and gate PCBs 130 and 135 are provided to the display panel 110 via the data and gate TCPs 120 and 125.

The backlight assembly 200 is disposed under or beside the display panel assembly 100 to provide light with a uniform luminance distribution to the display panel 110. The backlight assembly 200 includes one or more lamps 210, a light guide plate 240 for diffusing the light generated from the lamps 210 and any reflected light, one or more optical sheets 250 to enhance the luminance and its distribution of the light, a reflection plate 260 to reflect light traveling thereto, and a second mold frame 270 for receiving the lamps and lamp driving components.

The lamps 210 generate light upon receiving electric power externally provided. The lamps 210 are arranged, for example, in a region corresponding to an image display area of the display panel 110. The light guide plate 240 and the optical sheets 250 are disposed over or beside the lamps 210 to provide the diffused and condensed light to the display panel 110. The reflection plate 260 is disposed under or beside (i.e., the other side of) the lamps 210. The reflection plate 260 reflects light from the lamps 210 and any light traveling thereto from the light guide plate 240, the optical sheets 250, etc. to provide the reflected light to the display panel 110.

The second mold frame 270 securely receives the lamps 210. The second mold frame 270, for example, has sidewalls 272 and open upper and bottom surfaces. The light guide plate 240 and the optical sheets 250 are placed at upper area of the frame 270, and the lamps 210 are placed at lower area of the frame 270. The light guide plate 240 is disposed to be apart from the lamps 210 by a selected distance. The connection between the lamps 210 and the second mold frame 270 is described in detail below.

The container 300 is disposed under or beside the backlight assembly 200. The container 300 receives the reflection plate 260, the second mold frame 270 having the lamps 210, the light guide plate 240 and the optical sheets 250, in sequence.

The first mold frame 400 is disposed between the display panel assembly 100 and the backlight assembly 200. In this embodiment, the first mold frame 400 is made of material including synthetic resin. The first mold frame 400 securely receives the display panel 110. The first mold frame 400 has open top and bottom surfaces to transmit the light generated from the backlight assembly 200. The first mold frame 400 is combined with the container 300 so that the backlight assembly 200 is securely received in the container 300.

The top chassis 500 is placed on the display panel 110. The top chassis 500 is combined with the container 300 so that display panel 110 is securely disposed on the first mold frame 400. The top chassis 500 having a frame shape covers the edge area of the display panel 110 such that the effective display region of the display panel 110 is exposed through the open area of the top chassis 500. The open area of the top chassis 500 is substantially equal to or larger than the effective display region of the display panel 110.

The top chassis 500 includes a top surface 510 with the open area, sidewalls 520 extended from the top surface 510 in direction substantially perpendicular to the surface of the top surface 510, and chassis buffers 530a–530d formed on the top surface 510 and the sidewalls 520. In this embodiment, the four chassis buffers 530a–530d are each formed on corresponding one of the four sidewalls 520 and corresponding part of the top surface 510. The chassis buffers 530a–530d are to allow the length of the respective sidewalls 520 and each section of the top surface 510 to vary in accordance with variation in volume size of the first and second mold frames 400 and 270. In this embodiment, the chassis buffers 530a–530d are integrally formed with the top surface 510 and the sidewalls 520. This will be explained in detail with reference to FIG. 2. Although the top chassis 500 in this embodiment has four chassis buffers 530a–530d, the number of chassis buffers may vary in different embodiments in association with the size and/or thickness of the top chassis 500.

The first and second chassis buffers 530a and 530b are disposed opposite to each other and allow variation in the length of the sidewalls 520 and sections of the top surface 510 in direction D1, which is substantially parallel with the longitudinal direction of the lamps 210. The third and fourth chassis buffers 530c and 530d are disposed opposite to each other and allow variation in the length of the sidewalls 520 and sections of the top surface 510 in direction D2, which is substantially perpendicular to direction D1. By allowing variation in the length of the sidewalls 520 and sections of the top surface 510, the top chassis 500 is prevented from being distorted or buckled due to changes in the volume size of the first and second mold frames 400 and 270.

Since the lamps 210 in the backlight assembly 200 generates heat when they are turned on, the heat increases the temperature inside the LCD device 600. As a result, the components of the LCD device 600 may be subject to changes in their volume sizes. For example, the first and second mold frames 400 and 270 may have an increase in their volume sizes. Since the top chassis 500 covers the sidewalls of the first and second mold frames 400 and 270, the size of the top chassis 500 needs to be changed in accordance with changes in the size of the first and second mold frames 400 and 270. In other words, the sections of the top chassis 500 need to be proportionally increased when the size of the first and second mold frames 400 and 270 increases.

In this embodiment, the top chassis 500 is made of material including metal and the first and second mod frames 400 and 270 are made of material including resin. Since the thermal expansion coefficient of resin is higher than that of metal, the volume increase of the mold frames 400 and 270 is larger than that of the top chassis 500 when the temperature inside the LCD device 600 increases. Such discrepancy in the volume increases between the top chassis 500 and the mold frames 400 and 270 is prevented by employing the chassis buffers 530a–530d. In other words, the chassis buffers 530a–530d each allow the length of the respective sections of the top chassis 500 to vary by being shrunk or expanded in accordance with variation in the volume size of the mold frames 400 and 270.

Specifically, if the volume sizes of the first and second mold frames 400 and 270 increase or decrease in direction D1, the length of the respective sections of the top chassis 500 in direction D1 also increases or decreases in accordance with the changes in the volume sizes of the mold frames 400 and 270 owing to the expansion or shrink of the first and second chassis buffers 530a and 530b, which are formed on the top chassis sections extended in direction D1. In like manner, if the volume sizes of the mold frames 400 and 270 increase or decrease in direction D2, the length of the respective sections of the top chassis 500 in direction D2 also increases or decreases in accordance with the changes in the volume sizes of the mold frames 400 and 270 owing to the expansion or shrink of the third and fourth chassis buffers 530c and 530d, which are formed on the top chassis sections extended in direction D2. Accordingly, the top chassis 500 is prevented from being distorted or buckled even when the mold frames are subject to changes in their volume sizes.

Figure 2:
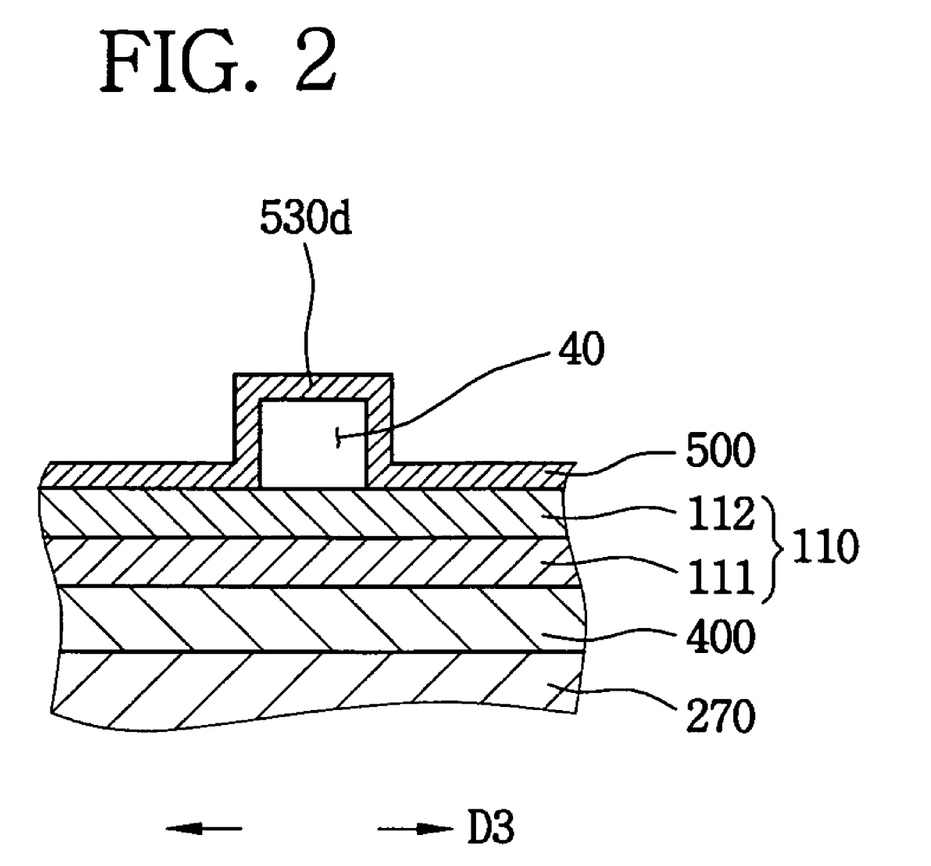
FIG. 2 is a cross-sectional view of the image display device taken along line I–I' in FIG. 1.

FIG. 2 is a cross-sectional view of the LCD device 600 taken along line I–I' in FIG. 1. As shown in FIG. 2, the display panel 110 is disposed between the top chassis 500 and the first mold frame 400. The top chassis 500 covers the sidewalls of the first and second mold frames 400 and 270 and securely hold the display panel 110 in the first mold frame 400. The fourth chassis buffer 530d has a space 40 as shown in FIG. 2. In this embodiment, the fourth chassis buffer 530d has a top section substantially parallel with the top surface 510 of the top chassis 500 and contiguous sections extended from edges of the top section in a direction substantially perpendicular to the top surface 510. The space 40 is surrounded by the top and contiguous sections of the chassis buffer 530d.

Assuming that each section of the top chassis is sectioned by corresponding one of the chassis buffers 530a–530d so that each section has two subsections, the chassis buffer 530d having the space 40 allows translation of the contiguous subsections of the top chassis 500 relative to one another in direction D3. In other words, when the volume size of the mold frames 400 and 270 changes due to a temperature change inside the LCD device, the chassis buffer 530d (specifically, the space 40) is shrunk or expanded by the translation of the contiguous subsections of the top chassis 500 in direction D3. Accordingly, the chassis buffer 530d allows the length of the top chassis section to vary in accordance with the size variation of the mold frames 400 and 270, so that distortion of the top chassis 500 is prevented.

The first through third chassis buffers 530a–530c each have the same structure as that of the fourth chassis buffer 530d as shown in FIG. 2. Thus, a detailed description of the first through third chassis buffers 530a–530c is omitted to avoid duplication.

Figure 3:
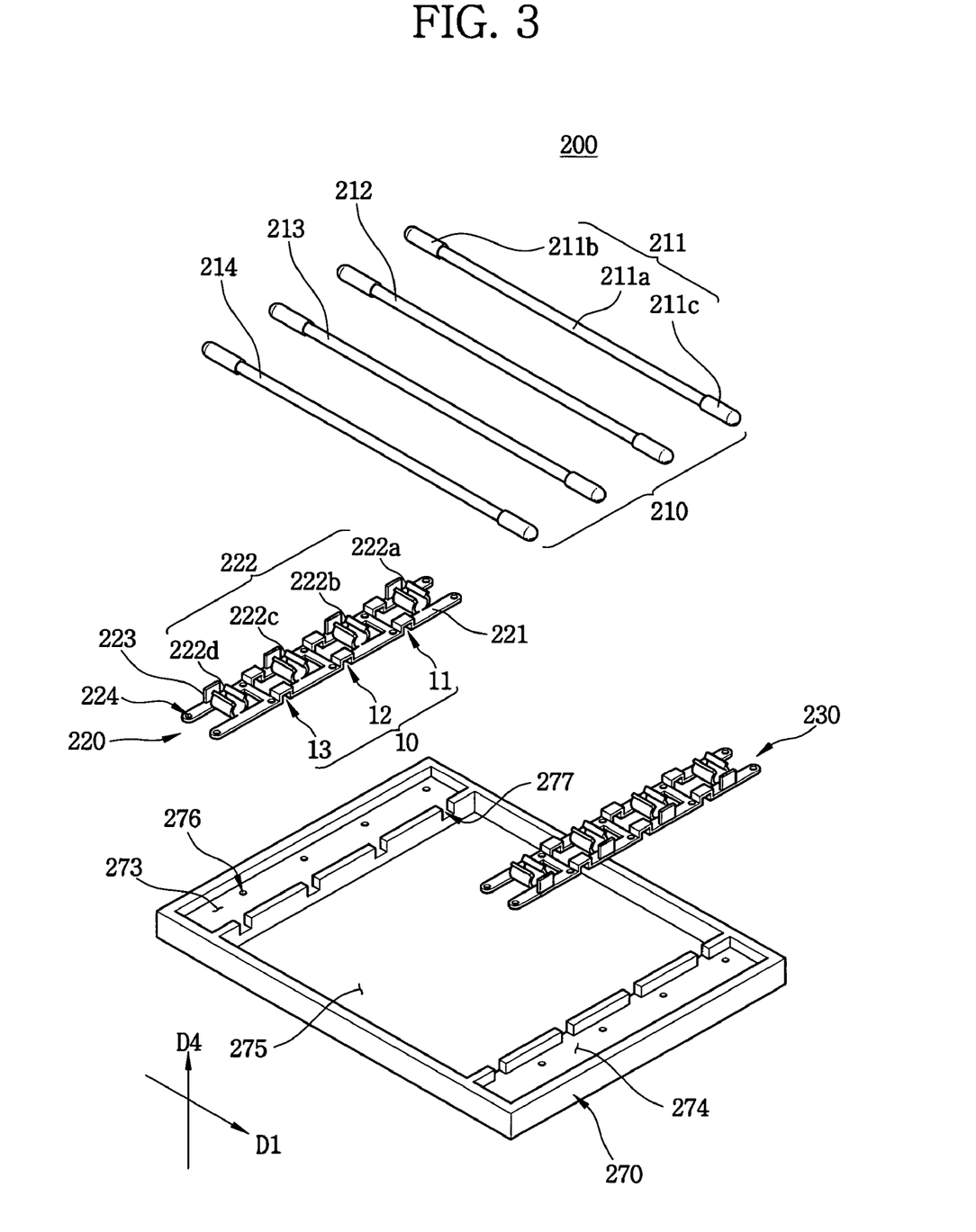
FIG. 3 is an exploded, perspective view of the backlight assembly in FIG. 1.

FIG. 3 is an exploded, perspective view of the backlight assembly 200 in FIG. 1. In FIG. 3, the light guide plate 240 and the optical sheets 250 of the backlight assembly 200 are omitted for purposes of clearly showing the structures of the lamps 210, the second mold frame 270, and lamp fixing members 220 and 230.

In this embodiment, the lamps 210 include first through fourth lamps 211–214. It should be noted that the number of lamps may vary in different embodiments of the LCD device. The four lamps 211–214 are substantially identical with each other in their structures. The four lamps 211–214 each have a lamp tube 211a containing discharge gas and fluorescent material, first and second external electrodes 211b and 211c to which electric power is applied. The first and second external electrodes 211b and 211c are disposed at the opposite end portions, respectively, of the lamp. The external electrodes 211b and 211c cover the outer surface of the lamp at the end portions.

The end portions of the respective lamps 211–214 are inserted into corresponding components of the lamp fixing members 220 and 230. In this embodiment, the first external electrodes 211b of the lamps 211–214 are respectively inserted into lamp clips 222 of the first lamp fixing member 220, and the second external electrodes 211c of the lamps 211–214 are respectively inserted into lamp clips of the second lamp fixing member 230. The lamp fixing members 220 and 230 include lamp clips 222 each to securely hold corresponding one of the external electrodes of the lamps 211–214. The lamp fixing members 220 and 230 are connected with a power supply (not shown) to provide electric power to the external electrodes 211b and 211c of the lamps 211–214. In this embodiment, the number of the lamp clips 222 of the lamp fixing members 220 and 230 is the same as that of the external electrodes 211b and 211c of the lamps 211–214.

In particular, the first lamp fixing member 220 includes base arms 221 to be in contact with the second mold frame 270, four lamp clips 222a–222d each connected between the base arms 221, and four flanges 223 each extended from one of the base arms 221. Since the second lamp fixing member 230 has the same structure as that of the first lamp fixing member 220, a detailed description of the second lamp fixing member 230 is omitted to avoid duplication.

The lamp clips 222a–222d each have an opening in direction D4, into and from which a corresponding lamp is inserted and detached. The lamp clips securely hold the lamps so that the lamps are prevented from being separated from the lamp fixing members 220 and 230. The first lamp fixing member 220 has four lamp clips 222a–222d in this embodiment. It should be noted that the number of lamp clips is not limited to four but may different in another embodiment based on the number of lamps. The lamp clips 222a–222d are disposed to have a selected interval between the adjacent ones of them. The first through fourth lamp clips 222a–222d receive and hold the first electrodes of the first through fourth lamps 211–214, respectively.

The first lamp fixing member 220 has buffers 10 for preventing distortion or buckling of the lamp fixing member 220 in case that the mold frame 270 is subject to changes in its volume size due to, for example, temperature changes inside the LCD device. Although the lamp fixing member 220 in this embodiment has three buffers 11–13, the number of the buffers may be different in another embodiment based on the length and/or thickness of the base arms 221. The buffers 11–13 each have a rectangular shape protruded in direction D4 from the base arms 221. The buffers 11–13 are respectively disposed between adjacent ones of the lamp clips 222 such that the first buffer 11 is disposed between the first and second lamp clips 222a and 222b, the second buffer 12 between the second and third lamp clips 222b and 222c, and the third buffer 13 between the third and fourth lamp clips 222c and 222d.

The lamp fixing member 220 includes flanges 223 for preventing movement of the lamps 211 in direction D1. The flanges 223 are each disposed proximate to corresponding one of the lamp clips 222. In this embodiment, the lamp fixing member 220 has four flanges 223 disposed corresponding to the first through fourth lamp clips 222a–222d, respectively. The flanges 223 are each extended from one of the base arms 221 in direction D4, which is substantially perpendicular to the longitudinal direction of the lamps 211.

The second mold frame 270 has first and second receiving spaces 273 and 274 to receive the first and second lamp fixing members 220 and 230, respectively. The receiving spaces 273 and 274 are each defined by the sidewalls and one of the inner opposing walls of the mold frame 270. The inner opposing walls have cutouts 277 each to receive corresponding one of the lamps 211. The mold frame 270 has an opening space 275 between the inner opposing walls, through which the light generated from the lamps 211 is transmitted.

The base arms 221 and the mold frame 270 have engaging apertures 224 and engaging holes 276, respectively, to be used for fixing the lamp fixing members 220 and 230 onto the mode frame 270. Each of the lamp fixing members 220 and 230 is fastened onto the mold frame 270 by means of a mechanical fastener, for example a screw, inserted into corresponding one of the engaging holes 276 through the corresponding one of the engaging apertures 224. The engaging holes 276 are threaded holes in case that the mechanical fasteners are screws.

Figure 4A:
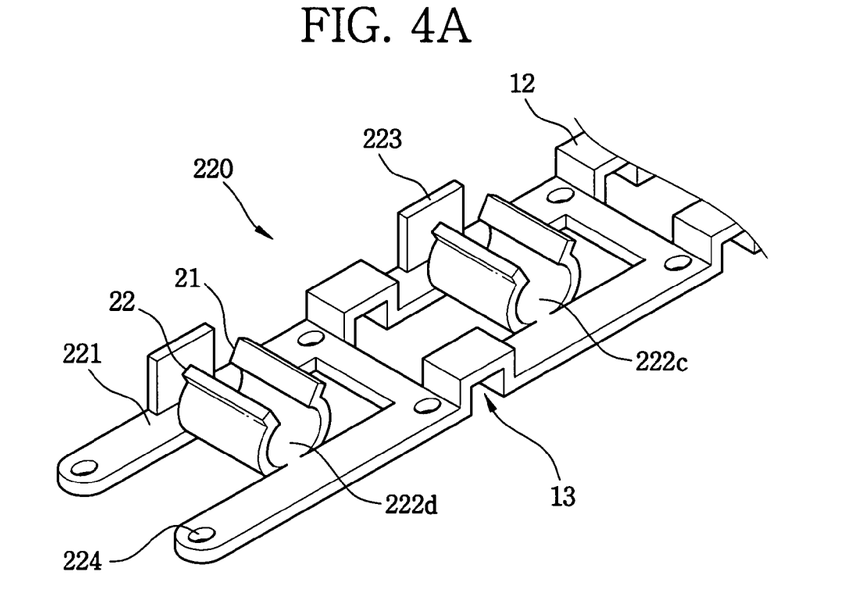
FIGS. 4A and 4B are perspective views of the lamp fixing members according to exemplary embodiments of the present invention.
Figure 4B:
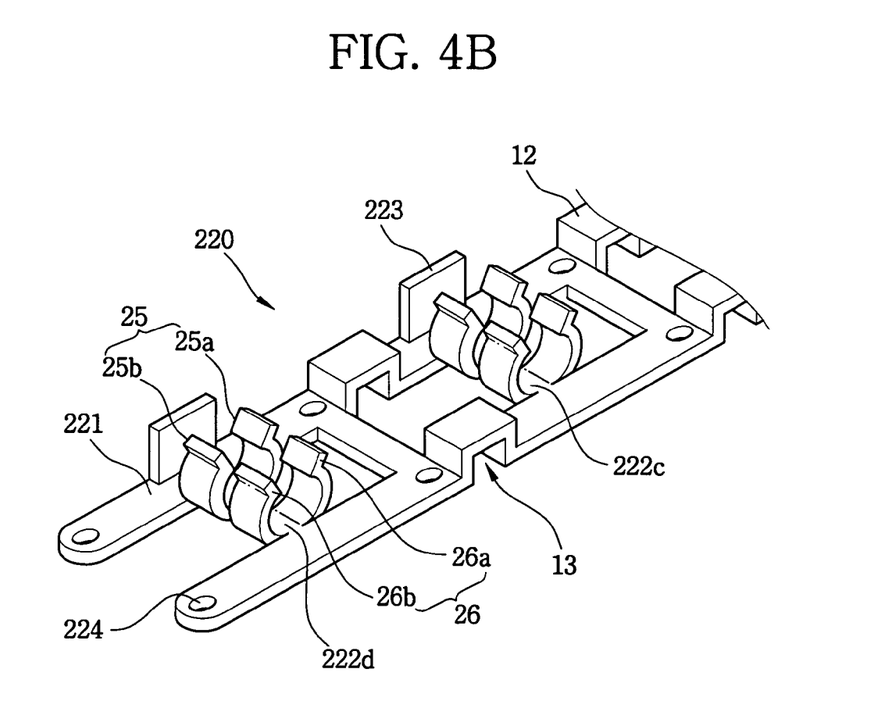

FIGS. 4A and 4B are perspective views of the lamp fixing members according to exemplary embodiments of the present invention. Referring to FIG. 4A, the lamp clips each have outboard flanges 21 and 22 to facilitate fixation and separation of the respective lamps. The outboard flanges 21 and 22 are formed at the end portions, respectively, of a U-shaped clip body of the respective lamp clips. The U-shaped clip body is rounded to fit the surface of the lamps. The lamp clips are electrically connected with the electrodes of the lamps.

Referring to FIG. 4B, the lamp clips each have two clip units 25 and 26 that are formed between the base arms 221 of the lamp fixing member. The clip units 25 and 26 are aligned with each other in the longitudinal direction of the lamps and apart from each other in a selected distance. The clip units 25 and 26 have openings to receive or eject the lamp, and the openings are also aligned with each other in the same direction. The clip units 25 and 26 have outboard flanges 25a and 25b and 26a and 26b, respectively, to facilitate fixation and separation of the respective lamps. The outboard flanges are formed at the end portions, respectively, of a U-shaped clip body of the respective clip units 25 and 26. The U-shaped clip body is rounded to fit the surface of the lamp. The clip units 25 and 26 are electrically connected with the electrodes of the lamps.

Figure 5:
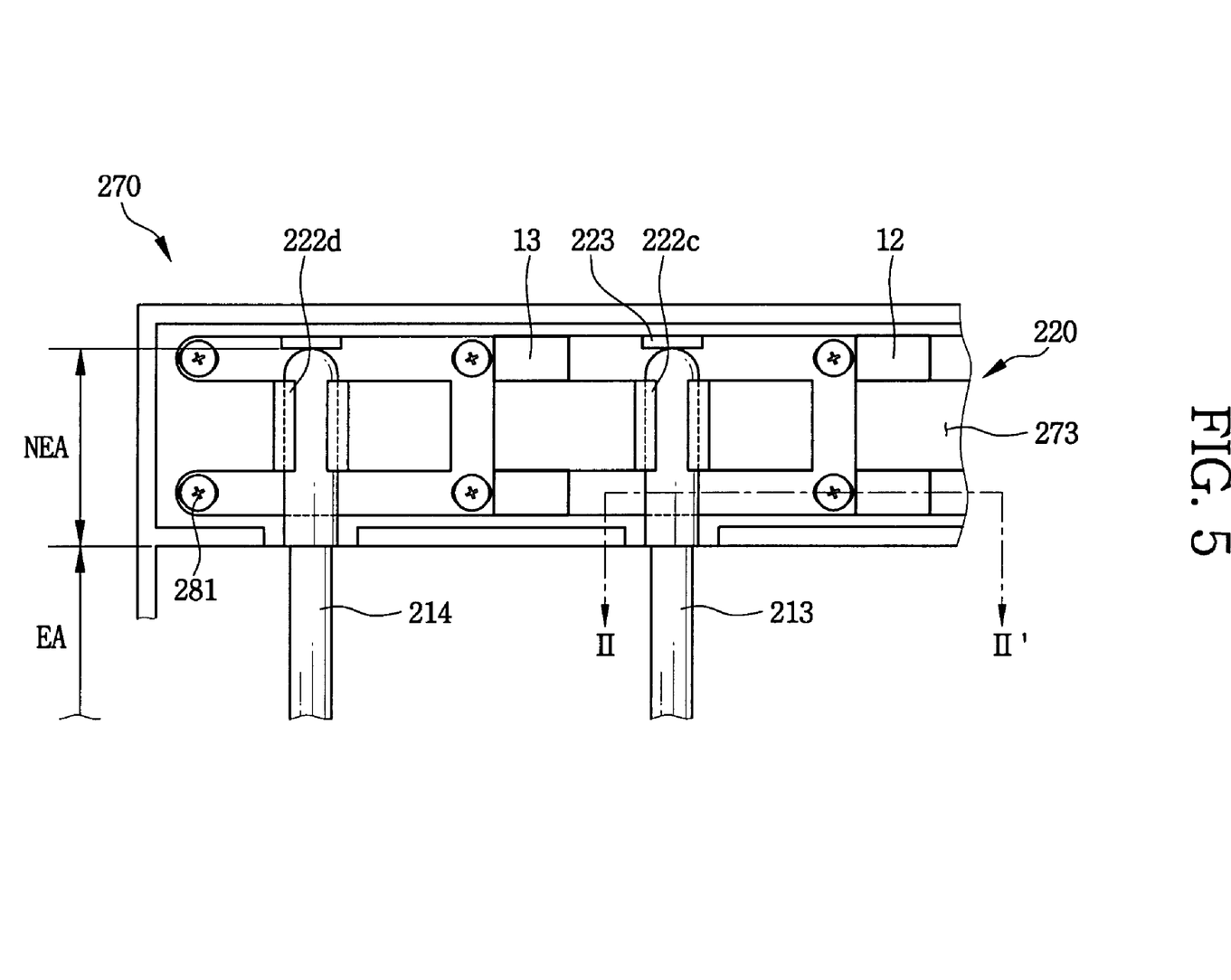
FIG. 5 is a cross-section view of the backlight assembly in FIG. 1.

FIG. 5 is a cross-section view of the backlight assembly 200 in FIG. 1. The lamp fixing member 220 is received in the receiving space 273 and fixed onto the mold frame 270 by means of the mechanical fastener, for example, a screw 281. The screw 281 is engaged with the engaging hole formed in the mold frame 270 through the engaging aperture formed in the lamp fixing member 220.

In this embodiment, the screw 281 has an outer diameter substantially equal to an inner diameter of the engaging hole in the mold frame 270. The engaging aperture in the lamp fixing member 220 has a first diameter in the longitudinal direction of the base arms of the lamp fixing member 220 and a second diameter in a direction substantially perpendicular to the longitudinal direction of the base arms. The first diameter is larger than the outer diameter of the screw 281, and the second diameter is substantially equal to the outer diameter of the screw 281. Since the engaging aperture in the lamp fixing member 220 has such a shape of different diameters, the screw 281 is prevented from being separated from the engaging aperture even when the base arms of the lamp fixing member 220 moves or are subject to changes in their length or position.

As shown in FIG. 5, the lamp fixing member 220 is disposed within the non-effective light emitting area NEA from which little light is generated. The lamps each have an end portion covered with the electrode and received in the lamp clip 222. Such end portions of the lamps are disposed within the non-effective light emitting area NEA. In contrast, the opening space of the mold frame 270 is disposed in an effective light emitting area EA where the light is generated toward the display panel. The effective light emitting area EA is corresponding to an effective display area of the display panel.

The flanges 223 extended from the base arms are each disposed between the sidewall of the mold frame 270 and the electrode of corresponding one of the lamps. For example, the flanges 223 are each in contact with the end of the electrode of the corresponding lamp. The flanges 223 are to prevent the lamps from moving in their longitudinal direction, so that the light emitting region of the lamps are prevented from moving into the receiving space 273 of the mold frame 270 and non-effective light emitting region of the lamps are prevented from moving into the effective light emitting area EA.

Figure 6:
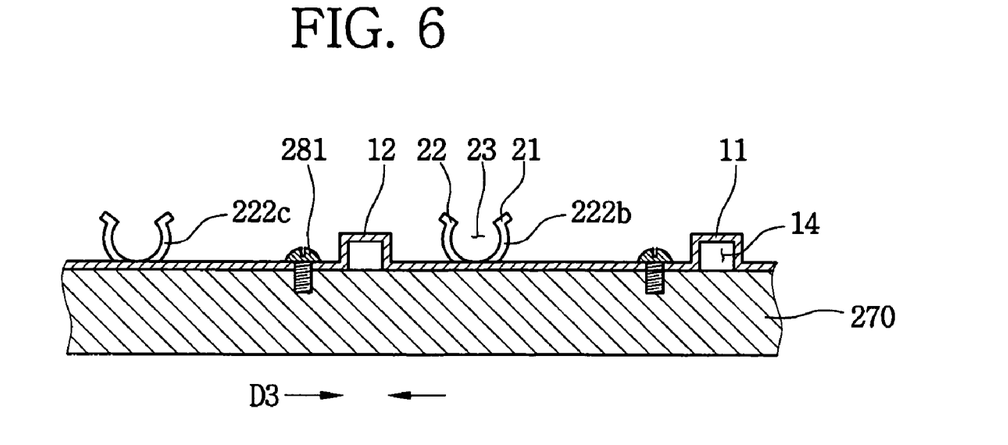
FIG. 6 is a cross-sectional view of the backlight assembly taken along line II–II' in FIG. 5.

FIG. 6 is a cross-sectional view of the backlight assembly taken along line II–II' in FIG. 5. The lamp fixing member is disposed on the surface of the mold frame 270. The buffers 11 and 12 are protruded above the surface of the mold frame 270 to form a rectangular shape and a space 14 therein. In particular, the buffers each have side sections extended from the base arm and the top section connected with the side sections at the side opposing the surface of the mold frame 270. The top section of the buffer is substantially parallel with the surface of the mold frame 270 and has a selected height from the surface of the mold frame 270.

Figure 7:
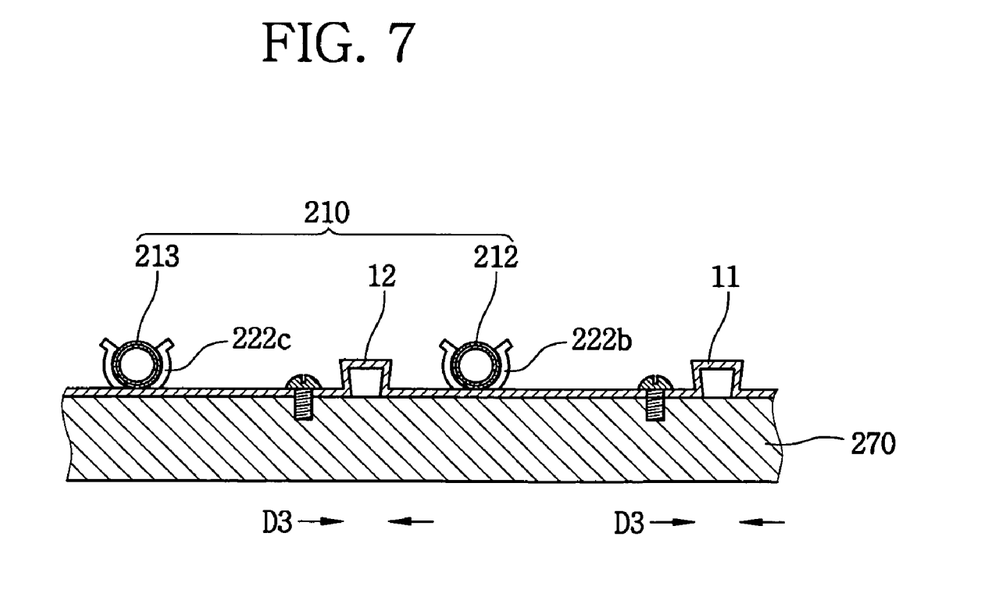
FIG. 7 is a cross-sectional view of the backlight assembly illustrating changes in the shape of the buffers in FIG. 6.

FIG. 7 is a cross-sectional view of the backlight assembly illustrating changes in the shape of the buffers 11 and 12. In this example, the volume size of the mold frame 270 increases due to a temperature increase inside the LCD device so that the receiving space of the mold frame decreases. As a result, the length of the base arms of the lamp fixing member need to be decreased to avoid distortion or buckling of the base arms and/or the lamp fixing member. In this case, the buffers of the lamp fixing member 270 each allow translation of the contiguous arm sections relative to one another in direction D3. Here, the contiguous arm sections are sections of each base arm sectioned by the buffer. When the lamp fixing member is shrunk to fit the reduced receiving space of the mold frame 270, the contiguous arm sections each move toward the buffer disposed therebetween. As a result, the side sections of the buffer become slant as shown in FIG. 7.

Figure 8A:
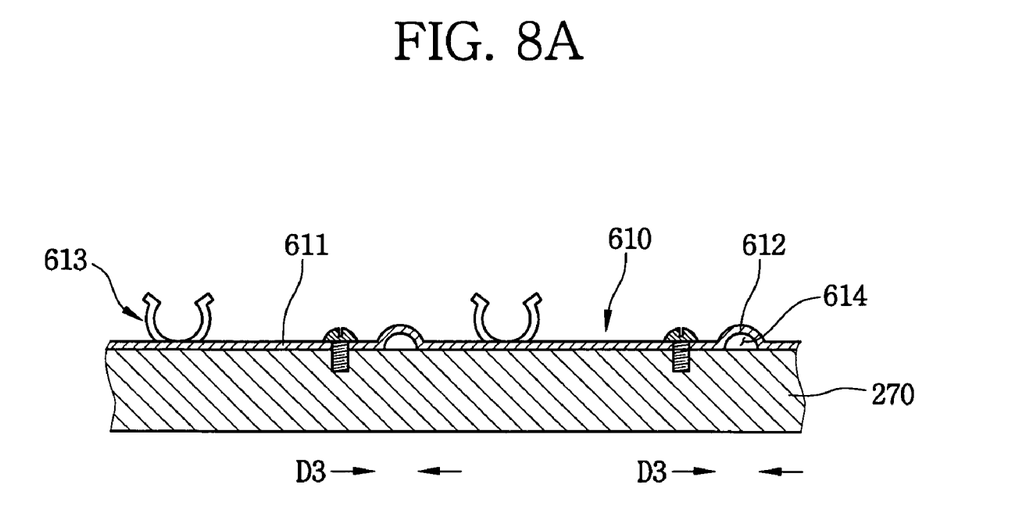
FIGS. 8A and 8B are cross-sectional views of the backlight assembly for illustrating buffers according to different embodiments of the present invention.
Figure 8B:
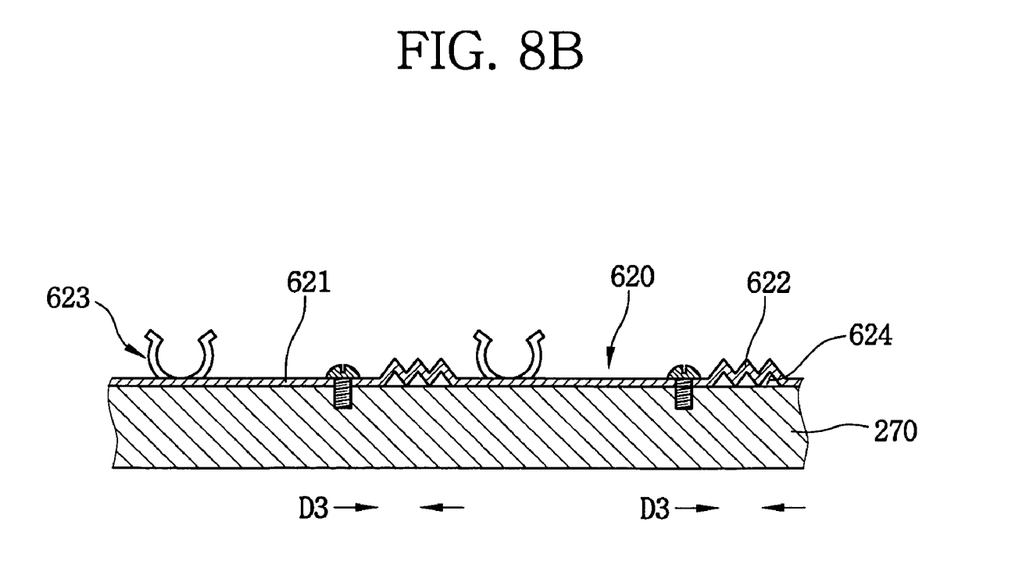

FIGS. 8A and 8B are cross-sectional views of the backlight assembly for illustrating buffers according to different embodiments of the present invention. Referring to FIG. 8A, the lamp fixing member 610 includes the buffers 612 each having a round shape, for example, a hemisphere shape. The buffers 612 each have a space 614 surrounded by the round shape buffer. The buffers 612 are protruded in the same direction as the lamp clips 613 are formed.

The base arm 611 is sectioned by the respective buffers so that each buffer is connected between the contiguous arm sections. When the lamp fixing member 610 is shrunk due to changes in the volume size of the mold frame 270, the contiguous arm sections are translated toward the buffer relative to one another in direction D3. As a result, the space 614 of the buffer 612 is reduced and the length of the base arm 611 is reduced as well.

Referring to FIG. 8B, the lamp fixing member 620 includes the buffers 622 formed on the base arm 621. The buffers 622 each have a triangular shape or a prism pattern of multiple triangular-shape units. A space 624 is formed between the buffer and the surface of the mold frame 270. In like manner, the buffers 624 each allow translation of the contiguous arm sections relative to one another in case that the lamp fixing member 620 is subject to changes in its size (specifically, in the length of the base arm 621) due to variation in the volume size of the mold frame 270. As a result, the lamp fixing member 620 is prevented from being distorted or buckled.

Figure 9:
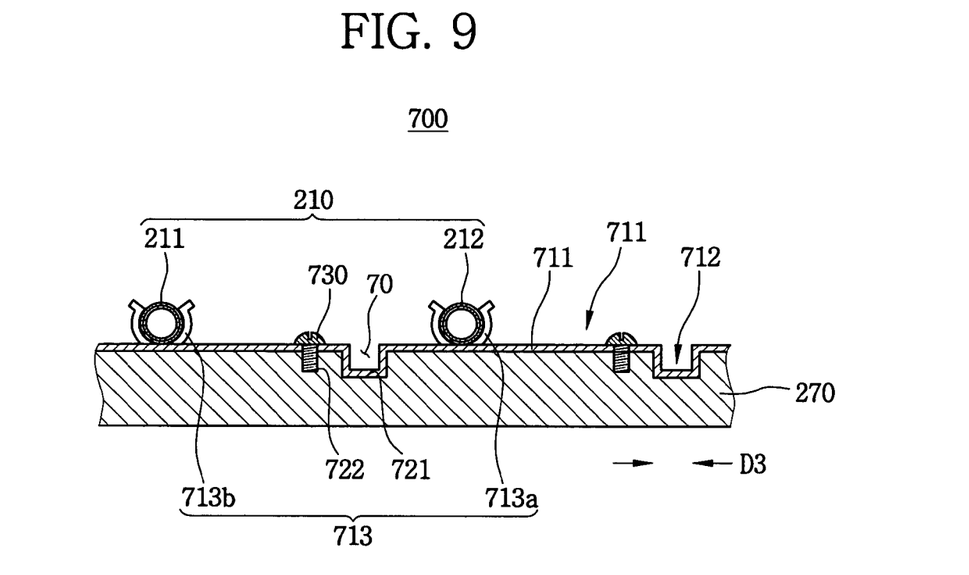
FIG. 9 is a cross-sectional view of a backlight assembly according to another embodiment of the present invention.
Figure 10:
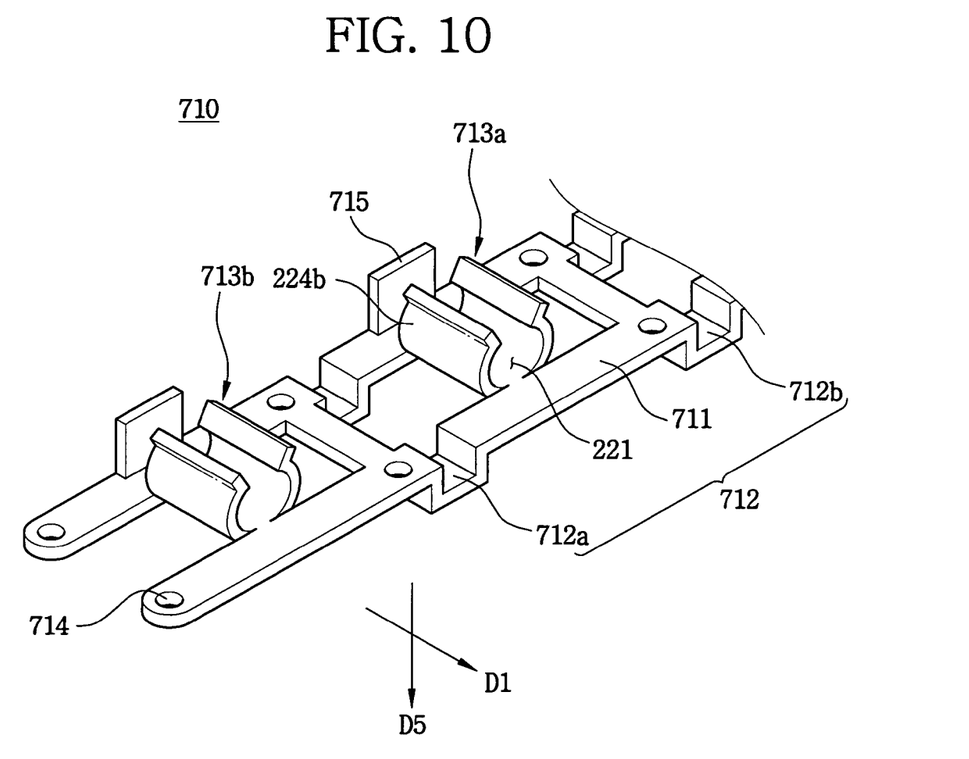
FIG. 10 is a perspective view of the lamp fixing member in FIG. 9.

FIG. 9 is a cross-sectional view of the backlight assembly for illustrating buffers according to another embodiment of the present invention. FIG. 10 is a perspective view of the lamp fixing member in FIG. 9. Referring to FIGS. 9 and 10, the backlight assembly 700 includes a lamp fixing member 710 and the second mold frame 720 on which the lamp fixing member 710 is disposed. The lamp fixing member 710 includes base arms 711 and buffers 712 formed on the respective base arms 711. The base arms 711 each have arm sections sectioned by the respective buffers 712.

The lamp fixing member 710 also includes lamp clips 713 for securely holding the lamps 210 and flanges 715 extended from one of the base arms 711. The lamp clips 713 and the flanges 715 have the substantially same structures as those of the lamp clips 222 and the flanges 223 in FIG. 3, and thus a detailed description of the lamp clips 713 and the flanges 715 is omitted to avoid duplication.

In this embodiment, the buffers 712 are each protruded from the base arms 711 toward the mold frame 720 in direction D5. Each of the buffers 712a and 712b is disposed between the adjacent lamp clips 713a and 713b and has a rectangular shape. The mold frame 720 has grooves 721 formed at positions corresponding to the buffers 712, respectively. The grooves 721 each have a rectangular shape matching that of the respective buffers 712. Thus, the buffers 712 are each received in corresponding one of the grooves 721 in the mold frame 720. The buffers 712 each have a space 70 that becomes smaller when the lamp fixing member 710 is shrunk due to variation in the volume size of the mold frame 720.

The lamp fixing member 710 also has engaging apertures 714 and the mold frame 720 has engaging holes 722. The lamp fixing member 710 is fixed onto the mold frame 720 by means of a fastener 730 (e.g., a screw) engaging with the engaging aperture 714 through the engaging hole 722. In addition to the fastener 730, the coupling of the buffers 712 with the grooves 721 improve coherence between the lamp fixing member 710 and the mold frame 720.

Having described the exemplary embodiments of the backlight assembly and the LCD device employing the same according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A backlight assembly comprising:
   at least one lamp that generates light; and
   a lamp fixing member including:
      base arms disposed substantially parallel with each other;
      at least one lamp clip that grips the at least one lamp, the at least one lamp clip being connected between the base arms; and
      at least one buffer formed in at least one of the base arms.

2. The backlight assembly of claim 1, wherein the at least one lamp clip includes multiple lamp clips each connected between the base arms, the lamp clips being arranged parallel with each other in a direction substantially perpendicular to a longitudinal direction of the base arms.

3. The backlight assembly of claim 2, wherein the at least one buffer includes multiple buffers each of which is disposed between adjacent ones of the lamp clips.

4. The backlight assembly of claim 1, wherein the base arms are each sectioned by the at least one buffer to have arm sections that are connected with opposing ends, respectively, of the at least one buffer.

5. The backlight assembly of claim 1, further including a container having a receiving space, the lamp fixing member being disposed in the receiving space of the container.

6. The backlight assembly of claim 5, wherein the base arms each have a first side in contact with the container and a second side opposite to the first side, the at least one buffer is protruded from the first side toward the container.

7. The backlight assembly of claim 6, wherein the container includes at least one groove to receive the at least one buffer protruded from the first side of the base arms.

8. The backlight assembly of claim 5, wherein the base arms each have a first side in contact with the container and a second side opposite to the first side, the at least one buffer is protruded from the second side.

9. The backlight assembly of claim 5, wherein the base arms include at least one engaging aperture for engaging the lamp fixing member and the container, and the container includes at least one engaging hole corresponding to the engaging aperture.

10. The backlight assembly of claim 9, further including a mechanical fastener that fastens the lamp fixing member onto the container by being inserted into the engaging hole through the engaging aperture.

11. The backlight assembly of claim 10, wherein the engaging aperture has a diameter in a longitudinal direction of the base arms, the diameter of the engaging aperture being larger than a diameter of the mechanical fastener.

12. The backlight assembly of claim 9, wherein the engaging hole is a threaded hole, and the mechanical fastener is a screw.

13. The backlight assembly of claim 1, wherein the at least one buffer is integrally formed with the base arms.

14. The backlight assembly of claim 1, wherein the at least one buffer has a rectangular shape protruded from the respective base arms.

15. The backlight assembly of claim 14, wherein the at least one buffer includes:
  a first section substantially parallel but not coplanar with the base arms;
  a second section substantially perpendicular to the base arms, the second section connecting one end of the first section and a base arm; and
  a third section substantially perpendicular to the base arms, the third section connecting an opposing end of the first section and the base arm.

16. The backlight assembly of claim 1, wherein the at least one buffer has a triangular shape protruded from the respective base arms.

17. The backlight assembly of claim 1, wherein the at least one buffer has a hemispherical shape protruded from the respective base arms.

18. The backlight assembly of claim 1, wherein the lamp fixing member includes multiple lamp clips, the at least one buffer being disposed between contiguous ones of the lamp clips.

19. The backlight assembly of claim 1, wherein the lamp fixing member further includes at least one flange extended from one of the base arms in a direction same as the at least one lamp clip is protruded, the at least one flange being disposed adjacent to the at least one lamp clip to prevent movement of the at least one lamp in a longitudinal direction of the at least one lamp.

20. The backlight assembly of claim 19, wherein the at least one flange includes multiple flanges and the at least one lamp clip includes multiple lamp clips, each of the flanges being disposed adjacent to corresponding one of the lamp clips.

21. The backlight assembly of claim 19, wherein the at least one flange is in contact with an electrode of the at least one lamp.

22. The backlight assembly of claim 1, wherein the container is made of material including synthetic resin, and the lamp fixing member is made of material including metal.

23. The backlight assembly of claim 1, wherein the at least one buffer is formed in the respective base arms to allow variation in a length of the base arms due to changes in a size of the receiving space.

24. An image display device comprising:
  a display panel that displays images; and
  a backlight assembly that provides light to the display panel, the backlight assembly including:
    at least one lamp that generates the light;
    a container having a receiving space; and
    a lamp fixing member disposed in the receiving space, the lamp fixing member having a length varying depending on changes in a size of the receiving space.

25. The image display device of claim 24, wherein the lamp fixing member includes:
  base arms disposed substantially parallel with each other;
  at least one lamp clip that grips the at least one lamp, the at least one lamp clip being connected between the base arms; and
  at least one first buffer formed in the respective base arms to allow variation in a length of the respective base arms.

26. The image display device of claim 25, further including a top chassis that holds the display panel onto the container, the top chassis including at least one second buffer disposed on respective sections of the top chassis, the at least one second buffer allowing variation in a length of the respective sections depending on changes in the size of the receiving space.

27. The image display device of claim 26, wherein the sections of the top chassis each include a sidewall and a top surface extended from an edge of the sidewall in a direction substantially perpendicular to the sidewall, the at least one second buffer is formed on the sidewall and the top surface.

28. The image display device of claim 27, wherein the sections of the top chassis are each sectioned by the at least one second buffer to have subsections that are connected to opposing ends, respectively, of the at least one second buffer.

29. The image display device of claim 28, wherein the at least one second buffer includes:
  side sections each extended from an edge of the respective subsections in a direction substantially perpendicular to the subsections; and
  top section connected between edges of the side sections opposite to edges connected with the subsections,
  wherein the side sections and the top section form a space of which shape varies depending on changes in the length of the base arms.

30. The image display device of claim 25, wherein the base arms are each sectioned by the at least one first buffer to have arm sections that are connected with opposing ends, respectively, of the at least one first buffer.

31. The image display device of claim 30, wherein the base arms each have a first side in contact with the container and a second side opposite to the first side, the at least one first buffer is protruded from the first side toward the container.

32. The image display device of claim 31, wherein the container includes at least one groove to receive the at least one first buffer protruded from the first side of the base arms.

33. The image display device of claim 30, wherein the base arms each have a first side in contact with the container and a second side opposite to the first side, the at least one first buffer is protruded from the second side.

34. The image display device of claim 25, wherein the at least one first buffer has a rectangular shape protruded from the respective base arms.

35. The image display device of claim 34, wherein the at least one first buffer includes:
   a first section substantially parallel but not coplanar with the base arms;
   a second section substantially perpendicular to the base arms, the second section connecting one end of the first section and a base arm; and
   a third section substantially perpendicular to the base arms, the third section connecting an opposing end of the first section and the base arm.

36. The image display device of claim 25, wherein the at least one first buffer has a triangular shape protruded from the respective base arms.

37. The image display device of claim 25, wherein the at least one first buffer has a hemispherical shape protruded from the respective base arms.

38. The image display device of claim 25, wherein the lamp fixing member includes multiple lamp clips, the at least one first buffer being disposed between contiguous ones of the lamp clips.

39. The image display device of claim 25, wherein the lamp fixing member further includes at least one flange extended from one of the base arms in a direction same as the at least one lamp clip is protruded, the at least one flange being disposed adjacent to the at least one lamp clip to prevent movement of the at least one lamp in a longitudinal direction of the at least one lamp.

40. The image display device of claim 39, wherein the at least one flange includes multiple flanges and the at least one lamp clip includes multiple lamp clips, each of the flanges being disposed adjacent to corresponding one of the lamp clips.

41. The image display device of claim 39, wherein the at least one flange is in contact with an electrode of the at least one lamp.

42. The image display device of claim 25, wherein the base arms include at least one engaging aperture for engaging the lamp fixing member and the container, and the container includes at least one engaging hole corresponding to the engaging aperture.

43. The image display device of claim 42, further including a mechanical fastener that fastens the lamp fixing member onto the container by being inserted into the engaging hole through the engaging aperture.

44. The image display device of claim 43, wherein the engaging aperture has a diameter in a longitudinal direction of the base arms, the diameter of the engaging aperture being larger than a diameter of the mechanical fastener.

45. The image display device of claim 25, wherein the container is made of material including synthetic resin, and the lamp fixing member is made of material including metal.

* * * * *